United States Patent [19]
Vajtay

[11] 4,229,929
[45] Oct. 28, 1980

[54] THERMOPLASTIC CONTAINER

[76] Inventor: Leslie Vajtay, 107 Stanford Ave., Colonia, N.J. 07067

[21] Appl. No.: 912,839

[22] Filed: Jun. 5, 1978

[51] Int. Cl.³ .................................... B65B 43/08
[52] U.S. Cl. ........................ 53/456; 156/69; 156/218; 220/4 R; 264/129; 264/250; 264/296; 425/392; 425/393
[58] Field of Search ............. 264/250, 294, 296, 320, 264/321, 129, 295, 249, 339; 425/392, 393; 220/4 R; 156/69, 218; 53/456

[56] References Cited

U.S. PATENT DOCUMENTS

| | | | |
|---|---|---|---|
| 2,259,508 | 10/1941 | Abramson | 425/392 |
| 2,532,844 | 12/1950 | Hulbert et al. | 425/392 |
| 2,645,591 | 7/1953 | Makrauer | 156/69 |
| 2,678,471 | 5/1954 | Barton | 264/320 X |
| 3,042,965 | 7/1962 | Gray et al. | 425/392 |
| 3,061,875 | 11/1962 | Gerow | 264/295 X |
| 3,346,435 | 10/1967 | Beck | 156/69 X |
| 3,383,750 | 5/1968 | Schroeder et al. | 264/249 X |
| 3,405,439 | 10/1968 | Uemura | 264/320 X |
| 3,418,409 | 12/1968 | Hesse et al. | 264/296 X |
| 3,495,504 | 2/1970 | Sloan | 93/55.1 |
| 3,499,072 | 3/1970 | Helling et al. | 264/339 X |
| 3,547,294 | 12/1970 | Williams | 264/129 X |
| 3,629,389 | 12/1971 | Quackenbush | 264/339 |
| 3,671,349 | 6/1972 | Westlake | 425/393 X |
| 3,753,819 | 8/1973 | Mollura | 156/69 |
| 3,767,507 | 10/1973 | Stahlecker et al. | 425/393 X |
| 3,769,393 | 10/1973 | Bjalme | 264/296 X |
| 3,913,774 | 10/1975 | Vajtay | 220/4 R |
| 3,986,659 | 10/1976 | Vajtay | 220/4 R |
| 4,057,444 | 11/1977 | Prot | 156/69 |
| 4,090,905 | 5/1978 | Amberg et al. | 156/218 |
| 4,094,124 | 6/1978 | Ljungcrantz | 53/456 X |
| 4,151,024 | 4/1979 | Ohlsson | 156/69 |
| 4,155,794 | 5/1979 | Raabe et al. | 156/69 X |

FOREIGN PATENT DOCUMENTS

| | | | |
|---|---|---|---|
| 671685 | 10/1963 | Canada | 156/69 |
| 1422117 | 11/1965 | France | 264/296 |
| 1048727 | 11/1966 | United Kingdom | 264/320 |

*Primary Examiner*—Philip Anderson

[57] ABSTRACT

Disclosed is a thermoplastic container formed from a flattened thermoplastic sleeve that is fabricated at a first manufacturing location. These flattened sleeves are conveniently transported to a second manufacturing location where they can be compactly stored. As containers are needed, the ends of the sleeve are stiffened by forming a flange or bead, thereby providing a tubular central section with a stable cross-sectional shape suitable for the application of conventional end closures.

3 Claims, 6 Drawing Figures

THERMOPLASTIC CONTAINER

CROSS REFERENCES TO RELATED PATENTS

1. Vajtay, U.S. Pat. No. 3,913,774, issued on Oct. 21, 1975.
2. Vajtay, U.S. Pat. No. 3,986,659, issued on Oct. 19, 1976.

BACKGROUND OF THE INVENTION

1. Field of the Invention

This invention relates to thermoplastic containers and more particularly to a method of fabricating thermoplastic cans from a flattened thermoplastic sleeve.

2. Description of the Prior Art

In my above mentioned U.S. patents, I described tubular containers having flexible sides and rigid end caps. The flexible sides of these containers were usually formed from a flattened thermoplastic sleeve. The end caps were more rigid and held the containers to their desired cross-sectional shape.

These prior art containers continue to enjoy tremendous industry acceptance and commercial success. In some applications, however, there is a need for containers which have a tubular central section with a stable cross-sectional shape prior to attaching the end caps. For example, tin cans have a stable cross-sectional shape (usually round) tubular central section. These central sections are usually fabricated at a first manufacturing location, transported, and delivered to a second manufacturing location. At the second manufacturing location, they must be stored until they are filled and capped with end closures. The transportation and storage of tubular central sections already have their final cross-sectional shape is a significant concern. The known prior art has not addressed or solved this problem.

SUMMARY OF THE INVENTION

Accordingly, it is an object of this invention to form an improved thermoplastic container.

Another object of this invention is to provide an improved technique for forming thermoplastic containers.

It is a further object of this invention to save transporation and storage space.

It is a still further object of this invention to transport and store compacted tubular central sections for thermoplastic containers.

Lastly, it is an object of this invention to fabricate thermoplastic cans capped by conventional canning equipment.

In accordance with my invention, a thermoplastic sleeve is fabricated from a thermoplastic material at a first manufacturing location. These sleeves are cut to length, as desired, and transported to a second manufacturing location—where they are stored until needed.

It is here important to note that the second manufacturing location is usually a cannery or the like where the containers are filled and reshipped. Prior to my present invention, it has been customary for such second manufacturing locations to receive as "blanks", pre-formed tubular central sections such as tin cans with at least one open end. Until the can is filled and capped it must be stored—and occupies as much space as full containers. This problem is significant and has been solved by my invention by which "blanks" may be stored flat until needed.

To fabricate a can, I heat treat the ends of the thermoplastic sleeve in a suitable die to form a flange or a bead. I have found that this stiffens the ends and holds the tubular cental section in a stable cross-sectional shape. End closures can then be applied with known canning equipment. Different shaped flanges permit the application of a great variety of end closures.

The above mentioned objects, features and advantages of my invention, together with others inherent in the same, are attained by the embodiments illustrated in the drawings, the same being merely preferred exemplary forms, and are described more particularly as follows.

IN THE DRAWINGS

DETAILED DESCRIPTION

Figure 1:
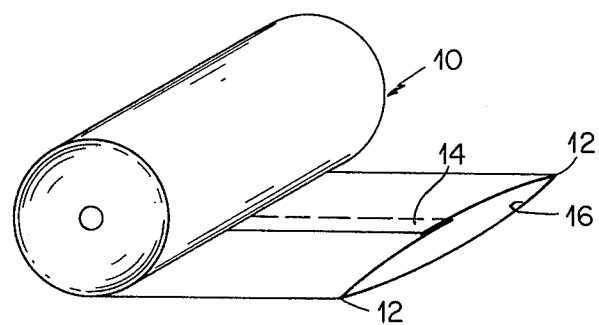
FIG. 1 is a schematic representation of a roll of flattened thermoplastic sleeve.

Referring to FIG. 1, roll 10 of thermoplastic material represents a flattened sleeve. It is formed from a sheet of thermoplastic of any known composition such as polyvinyl-chloride (PVC) in the range of 0.0075 to 0.020 inches in thickness. It is shown scored and creased along lines 12 and adhesively joined along the longitudinal seam 14. Such flattened sleeves can also be formed by techniques that do not require an overlapped seam 14. It is also known to provide more than one pair of creases 12, depending on the desired cross-sectional shape of the container. These and other details are described in my aforementioned cross-referenced patents which are incorporated by reference. The flattened sleeve may also be a laminate. A metalized polyester 16 in the order of 0.005 to 0.001 inches in thickness forms a barrier container to replace foil liners in cardboard containers.

Figure 2:
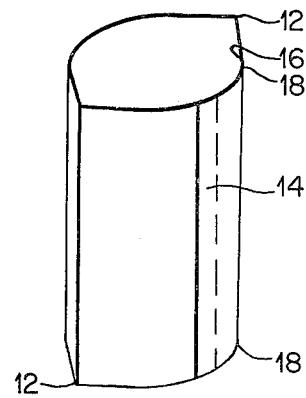
FIG. 2 is a portion of thermoplastic sleeve cut to a desired length.

Refer now to FIG. 2 which shows a flattened sleeve cut to a desired length at ends 18. Creases 12 and seam 14 are the same as in FIG. 1. By my present invention, these cut flattened sleeves would be formed at a first manufacturing location and then transported to a second manufacturing location. It is conceivable that a second manufacturing location would desire delivery of a roll 10, as in FIG. 1, for custom cutting containers of various lengths. In most cases, however, a second manufacturing location would desire delivery of pre-cut blanks, which when urged into the open position would resemble the structure of FIG. 2.

Figure 3:
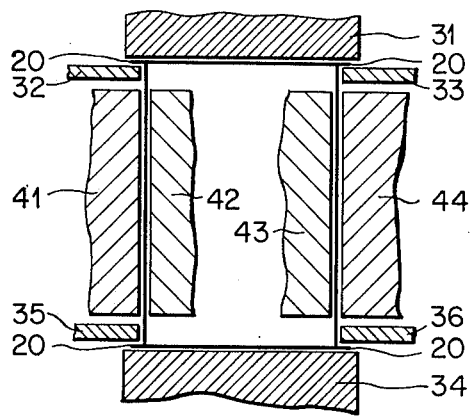
FIG. 3 is a schematic representation of the heat treating step forming a flange and eliminating the crease.

The operation illustrated in FIG. 3 would always take place at the second manufacturing location. In order to provide a stable cross-sectional shape, I have found that a flange 20 is all that is required. In the present example, a radially extending circular flange at both ends provides a cylindrical blank, suitable for end closure application by conventional equipment. The die portions schematically represented by reference numerals 31, 32, 33, 34, 35, and 36 apply heat and pressure to form the flange.

If it is also desired to remove crease 12, then die portions 41, 42, 43 and 44 can be used to apply the desired heat and pressure. These heat treating steps can take place either sequentially or simultaneously depending on the availability of equipment. In any event, only the stiffening of the ends is required for maintaining a stable cross-sectional shape.

Figure 4:
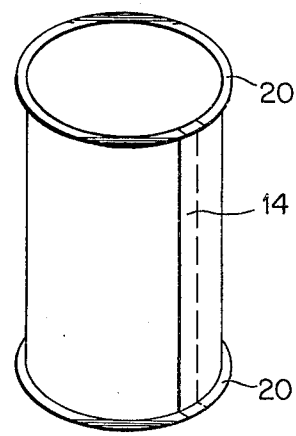
FIG. 4 is a blank with a flange holding it in a cylindrical shape.
Figure 5:
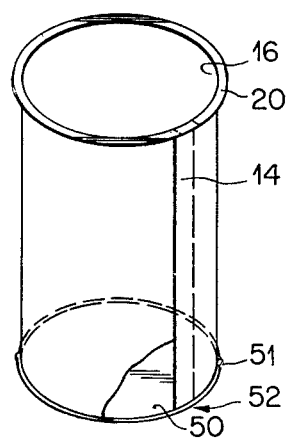
FIG. 5 is the cylindrical blank with a metal end closure applied with standard canning equipment.

The resultant blank is shown as a coherent cylinder in FIG. 4. Radially extending circular flanges 20 provide the desired stability for a cylindrical blank. Such a flange is adapted to receive a metal end closure 50 applied along a joint 51 as shown in FIG. 5. The same equipment presently used at the second manufacturing location for applying metal end closures 50 to metal cylindrical blanks is suitable for forming the illustrated joint 51 with my thermoplastic cylindrical blank. If a hermetic seal is desired, extra jointing material can be applied at interface 52 between seam 14 and closure 50. At this point the thermoplastic can can be filled with its desired contents and a second metal end closure can be applied at flange 20.

One of the advantages of a thermoplastic can is its transparency. It is frequently desirable to expose the contents to the prospective purchaser. If, however, an opaque can or a barrier container is desired, then a blank having the optional metallized polyester layer 16 can be used. Transparent barrier materials are also applicable.

Figure 6:
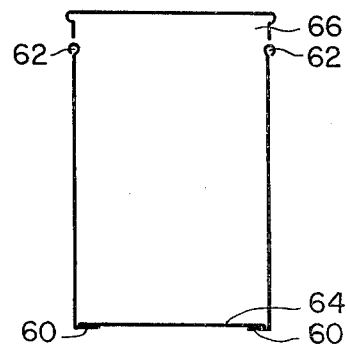
FIG. 6 is an alternate embodiment illustrating both a flange and bead with exemplary top and bottom closures.

Refer now to FIG. 6 for an alternate embodiment. An inwardly radiating flange 60 is shown applied to the bottom end while a bead has been applied to the top end, thereby providing a stable cylindrical blank. A bottom plate 64 can then be adhesively or thermally joined to the flange 60. Bottom plate 64 can be fabricated from the same thermoplastic material as the cylindrical blank, although cardboard or any other packaging material, depending on the intended contents, is suitable. A semi-rigid lid 66, suitably contoured to fit over bead 62 completes the container.

What I have described is a new thermoplastic packaging technique by which flattened blanks can be transported and stored until needed. The user performs the secondary operations of stiffening the ends and/or eliminating the creases by a heat treatment to stabilize the cross-sectional shape, and applying the end closures. While the preferred embodiments have been ilustrated with end stiffening means 20, it has been found that heat treating the creases 12 only also provides a stable cross-sectional shape. In the case of a rectangle, a second pair of creases 12 are applied to the flattened sleeve prior to stabilizing the cross-sectional shape either by heat treating the creases, stiffening the ends by a heat treatment, or both. While several examples illustrative of preferred embodiments have been described, those skilled in the art will recognize that various changes may be made without departing from the spirit and scope of my invention.

I claim:

1. Method of forming a thermoplastic can comrpising the steps of:
    providing a flattened thermoplastic sleeve at a first manufacturing location, said sleeve having at least one pair of creases;
    transporting said flattened thermoplastic sleeve in its flattened state to a second manufacturing location, all further fabrication steps occurring at said second manufacturing location;
    opening said flattened thermoplastic sleeve into a substantially round cross-sectional shape;
    eliminating said at least one pair of creases by inserting said sleeve into a die having heated die portions placed adjacent said pair of creases on both the inside wall and outside wall of said sleeve and applying heat and pressure to both the inside and outside walls;
    stiffening the ends of said opened thermoplastic sleeve into said substantially round cross-sectional shape by inserting said sleeve into a die having heated die portions surrounding the lip of the sleeve at each end and applying heat and pressure to form an outwardly radiating flange that is adapted to receive a metal canning disc as an end closure at each end of the sleeve, thereby forming a stable cylindrical central section;
    metallizing at least one surface of said stable cylindrical central section;
    providing first and second end closures for said cylindrical central section;
    joining the first end closure to said cylindricl central section, thereby sealing one end of said cylindrical central section and forming an open can;
    filling said open can with desired contents; and
    joining the second end closure to the other end of said cylindrical central section, thereby completing the sealing of said filled thermoplastic can.

2. Method as in claim 1 wherein said step of stiffening forms a bead at least at one end of said thermoplastic sleeve.

3. Method as in claim 1 wherein said step of stiffening forms a flange that radiates inwardly from the periphery of said at least one end and is adapted to receive a thermoplastic disc as an end closure.

* * * * *